United States Patent
Brearley et al.

(10) Patent No.: US 7,343,212 B1
(45) Date of Patent: Mar. 11, 2008

(54) ITEM SUBSTITUTION IN THE MANUFACTURE OF PRODUCTS

(75) Inventors: Quentin Stewart Brearley, Rancho Palos Verdes, CA (US); James P. Chilvers, Irvine, CA (US); Anil Kumar Sharma, Culver City, CA (US)

(73) Assignee: Glovia International, Inc., El Segundo, CA (US)

( * ) Notice: Subject to any disclaimer, the term of this patent is extended or adjusted under 35 U.S.C. 154(b) by 481 days.

(21) Appl. No.: 11/015,620

(22) Filed: Dec. 17, 2004

Related U.S. Application Data

(60) Provisional application No. 60/530,631, filed on Dec. 17, 2003.

(51) Int. Cl.
*G05B 13/02* (2006.01)
*G06F 19/00* (2006.01)
*G06Q 10/00* (2006.01)

(52) U.S. Cl. ............. 700/106; 700/28; 700/99; 700/108; 700/115; 700/214; 700/216; 705/28

(58) Field of Classification Search ............ 700/28, 700/49, 96, 97, 99, 105–107, 108, 115, 116, 700/214, 216; 705/28, 29
See application file for complete search history.

(56) References Cited

U.S. PATENT DOCUMENTS

| | | | | |
|---|---|---|---|---|
| 5,311,424 A * | 5/1994 | Mukherjee et al. | ............ | 705/29 |
| 5,630,070 A | 5/1997 | Dietrich et al. | ................ | 705/8 |
| 6,141,647 A | 10/2000 | Meijer et al. | .................. | 705/1 |
| 6,615,092 B2 | 9/2003 | Bickley et al. | ............... | 700/99 |
| 6,629,008 B2 | 9/2003 | Shiiba et al. | ............... | 700/100 |
| 6,915,275 B2 | 7/2005 | Banerjee et al. | .............. | 705/26 |
| 6,934,594 B2 | 8/2005 | Loring et al. | ............... | 700/100 |
| 7,050,874 B1 * | 5/2006 | Tenorio | ...................... | 700/107 |
| 2003/0126024 A1 * | 7/2003 | Crampton et al. | ............ | 705/22 |
| 2004/0117048 A1 | 6/2004 | Wei | ............................ | 700/100 |
| 2004/0117227 A1 | 6/2004 | Wei | .............................. | 705/7 |
| 2004/0148212 A1 | 7/2004 | Wu et al. | ...................... | 705/8 |
| 2005/0090921 A1 * | 4/2005 | Denton et al. | .............. | 700/100 |

OTHER PUBLICATIONS

Wacker, J.G., Lummus, R.R., "Sales Forecasting for Strategic Resource Planning," International Journal of Operations & Production Management 22, 9/10 (2002) 1014-1031.

* cited by examiner

*Primary Examiner*—Leo Picard
*Assistant Examiner*—Sean Shechtman
(74) *Attorney, Agent, or Firm*—Baker Botts L.L.P.

(57) ABSTRACT

A method for item substitution in a manufacturing process includes receiving an order for manufacture of a product and generating a first electronic bill of material for the product. The first electronic bill of material identifies multiple primary components to be assembled into the product. The method also includes identifying a trigger initiating substitution of one of the primary components, identifying multiple potential substitute components in response to the trigger, and identifying a substitution rule governing selection of one of the potential substitute components. The method also includes selecting one of the potential substitute components according to the substitution rule, substituting the selected one of the potential substitute components for the one primary component, and generating a second electronic bill of material for the product. The second electronic bill of material identifies the selected one of the potential substitute components.

15 Claims, 3 Drawing Sheets

ITEM SUBSTITUTION IN THE MANUFACTURE OF PRODUCTS

RELATED APPLICATION

This application claims priority to U.S. Provisional Patent Application Ser. No. 60/530,631 filed Dec. 17, 2003, entitled Global Business Management.

TECHNICAL FIELD OF THE INVENTION

The present invention relates generally to the manufacture of products, and, more particularly, to item substitution in the manufacture of products.

BACKGROUND OF THE INVENTION

Manufacturers use manufacturing tools and materials to build products. While capacities of manufacturing tools sometimes constrain manufacturers, availabilities of materials often constrain manufacturers.

SUMMARY OF THE INVENTION

In accordance with the present invention, techniques for substituting items in the manufacture of products are provided. According to particular embodiments, these techniques enable the substitution of items in the manufacture of products in response to triggers and according to substitution rules.

According to a particular embodiment, a method for item substitution in a manufacturing process includes receiving an order for manufacture of a product and generating a first electronic bill of material for the product. The first electronic bill of material identifies multiple primary components to be assembled into the product. The method also includes identifying a trigger initiating substitution of one of the primary components, identifying multiple potential substitute components in response to the trigger, and identifying a substitution rule governing selection of one of the potential substitute components. The method also includes selecting one of the potential substitute components according to the substitution rule, substituting the selected one of the potential substitute components for the one primary component, and generating a second electronic bill of material for the product. The second electronic bill of material identifies the selected one of the potential substitute components.

Embodiments of the invention provide various technical advantages. According to particular embodiments, these techniques may eliminate or reduce inefficiencies and other problems associated with traditional manufacturing systems. These techniques may allow manufacturing systems to substitute items scheduled to be assembled into completed products before the items are actually assembled. Furthermore, these techniques may allow manual or automatic substitutions based on configurable triggers. For example, substitution may be triggered in response to costs, availabilities, and incompatibilities of components. According to particular embodiments, costs may be reduced by substituting less expense items for more expensive items. Alternatively or in addition, productivity may be increased by substituting available items for unavailable items. Alternatively or in addition, errors may be avoided by substituting compatible items for incompatible items. Furthermore, these techniques may allow manufacturers to tailor products to particular customers. These techniques therefore may allow manufacturing systems to tailor products to meet customer needs.

Other technical advantages of the present invention will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which.

DETAILED DESCRIPTION OF THE INVENTION

Figure 1:
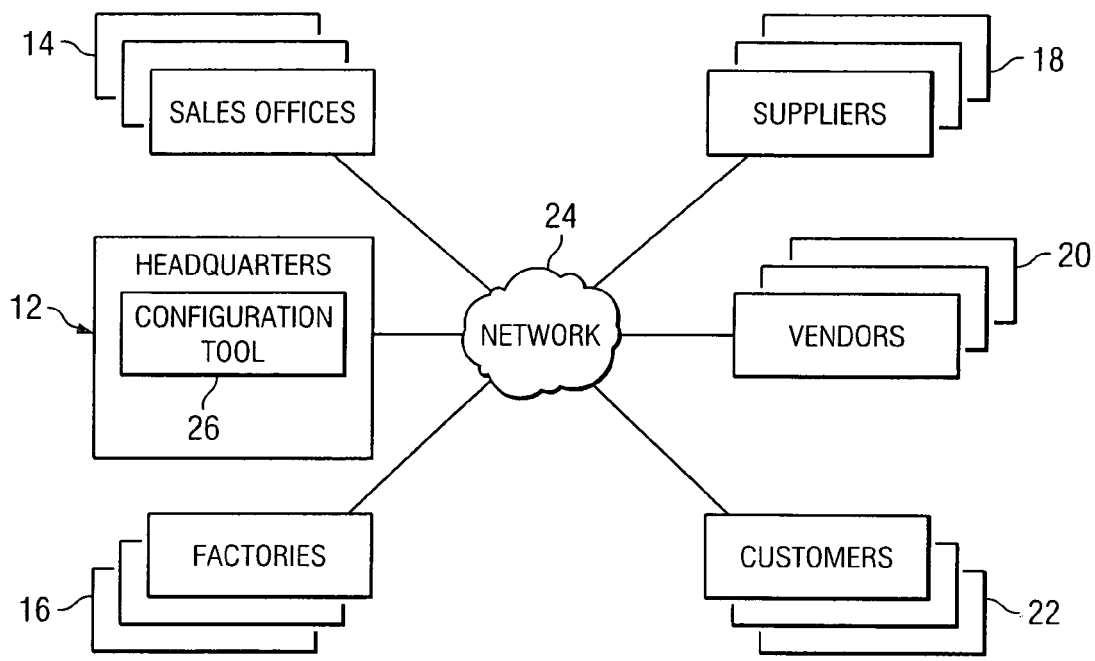
FIG. 1 illustrates a manufacturing system that includes elements capable of substituting items in the manufacture of products in accordance with various embodiments of the present invention.

FIG. 1 illustrates a manufacturing system, indicated generally at 10, that includes a headquarters 12, sales offices 14, factories 16, suppliers 18, vendors 20, and customers 22 interconnected through a network 24. As illustrated, headquarters 12 includes a configuration tool 26 that can substitute items in the manufacture of products. In general, configuration tool 26 determines when to substitute items in bills of material associated with requested products. In particular, configuration tool 26 may substitute items in bills of materials in response to one or more of various types of triggers. Furthermore, configuration tool 26 may substitute items according to one or more of various substitution rules.

Headquarters 12 represents a centralized business office for managing and planning aspects of manufacturing activities occurring within manufacturing system 10. Sales offices 14 represent distributed business offices for generating demand for the manufacture of products in manufacturing system 10. Factories 16 represent facilities involved in the manufacture of products. Suppliers 18 and vendors 20 represent entities that supply resources for use in the manufacturing process. Customers 22 represent entities requesting the manufacture of products in manufacturing system 10. Headquarters 12, sales offices 14, factories 16, suppliers 18, vendors 20, and customers 22 may each include appropriate hardware, software, and controlling logic capable of communicating with other elements of manufacturing system 10 through network 24.

Network 24 represents any suitable collection of hardware, software, and controlling logic capable of interconnecting elements coupled to network 24. In a particular embodiment, network 24 may include one or multiple networks, such as a telecommunications network, a local area network (LAN), a wide area network (WAN), the Internet, and/or any other appropriate networks. Thus, network 24 provides infrastructure to support communications within manufacturing system 10.

Configuration tool 26 represents any suitable collection of hardware, software, and controlling logic for substituting items in manufacturing products. Thus, according to a particular embodiment, configuration tool 26 is a software application loaded onto a general purpose computer. Note that while illustrated as being located within headquarters 12, configuration tool 26 may be utilized in various locations within manufacturing system 10. For example, configuration tool 26 may be located within a particular factory 14, a particular sales office 16, or any other appropriate location. Furthermore, configuration tool 26 may be distributed among various elements of manufacturing system 10.

In operation, customers 22 request manufacture of products within manufacturing system 10. For example, customers 22 may communicate orders to sales offices 14 and/or headquarters 12 using network 24 to request production of products by factories 16. The orders may be communicated between elements of manufacturing system 10 through network 24. For example, orders may be communicated through network 24 using a common protocol such as extensible markup language (XML). Thus, for example, customers 22 may communicate purchase orders through network 24 to headquarters 12 and/or sales offices 16. Similarly, factories 14 may communicate work orders through network 24 to suppliers 18 and/or vendors 20.

In response to orders for products and/or at any other appropriate time, configuration tool 26 may configure bills of material for a requested product. A bill of material includes information relevant to the manufacture of a product. For example, a bill of material may list components scheduled to be assembled into a product. A bill of material may also include one or more dates associated with manufacturing activities such as the beginning of production or the shipment of a product. Alternatively or in addition, a bill of material may include an identifier linking the bill of material to a specific order. Various other types of information may be included in a bill of material. Furthermore, a bill of material may be an electronic message or document conforming to a protocol for text-based communications. For example, a bill of material may conform to XML or other protocols.

Based on a requested product associated with a particular order, configuration tool 26 may identify various primary components to be included in a bill of material. According to particular embodiments, customers 22 may identify primary components to configuration tool 26 for inclusion in the bill of material. Alternatively or in addition, primary components may be specified by configuration tool 26 or some other element of manufacturing system 10 for the requested product. Note that, as used herein, primary components are labeled as "primary" because these components are included in a bill of material that may be analyzed to determine whether primary components may be substituted with substitute components.

Configuration tool 26 may identify a trigger that initiates substitution of one or more items in the bill of material. In general, a trigger indicates that circumstances suggest that substitution may be appropriate. Various types of triggers may be utilized.

For example, availabilities of components may trigger substitution. According to a particular embodiment, configuration tool 26 may determine a deadline associated with an order and/or a bill of material. The deadline may represent a date on which components should be available for assembly into a requested product. Configuration tool 26 may compare the deadline with dates that components are scheduled to be available, and configuration tool 26 may identify a trigger when one or more of the components are not scheduled to be available by the deadline. Configuration tool 26 or another element of manufacturing system 10 may store information related to dates components are scheduled to become available. These dates may correspond to purchase orders for components and/or work orders associated with factories 16, suppliers 18, and/or vendors 20. For components that are not scheduled to be available by the deadline, configuration tool 26 may suggest substitution and/or automatically substitute items in the bill of material.

Alternatively or in addition, cost may be a trigger indicating that substitution of items in a bill of material may be appropriate. For example, configuration tool 26 may store information indicating thresholds for costs associated with products and/or individual components. When projected costs of the product or components exceed one or more thresholds, configuration tool 26 may identify a trigger, suggest substitution, and/or automatically substitute items in the bill of material.

Alternatively or in addition, substitution may be triggered in response to configuration tool 26 identifying incompatibilities between two or more components represented in a bill of material. Incompatibilities may exist for various reasons. For example, two or more components may be incompatible due to physical, electrical, or other constraints. Alternatively or in addition, combination of certain components in the same device may generate errors for various other reasons. Information regarding incompatibilities may be stored by configuration tool 26 and analyzed in response to generation or receipt of a bill of material. When one or more incompatibilities exist, configuration tool 26 may identify a trigger, suggest substitution, and/or automatically substitute items in the bill of material.

Another type of trigger involves the existence and/or availability of alternative models or versions of components and/or products. Alternative models or versions may be available for various reasons. For example, components and products may be redesigned as time passes. Furthermore, components and products may be produced in multiple production locations and/or at different times. Thus, a single component or product may actually have multiple versions. Configuration tool 26 may store or access information identifying these circumstances and act appropriately. For example, configuration tool 26 may identify that older or alternative models of a requested product are available and substitution may be triggered.

Various other types of triggers may be identified. Furthermore, note that one or more types of triggers may be utilized at any one time. For example, substitution may be suggested by configuration tool 26 in response to availabilities as well as cost associated with components. In addition, particular triggers may be associated with particular components and/or customers 22. For example, substitution may be triggered for particular customers 22 based on identities of manufacturers of components. According to a particular embodiment, configuration tool 26 may determine that particular customers 22 should not be provided with components manufactured and/or supplied by competitors.

After identifying a trigger indicating that substitution of one or more components may be appropriate, or at any other appropriate time, configuration tool 26 may identify potential substitute components. Potential substitute components include components that may be substituted for a primary component. Substitute components may be different models or versions of the same component. Note that substitute components may include multiple components that can be combined to substitute for an individual component.

Information regarding primary components and potential substitute components may be received and/or stored by configuration tool 26. For example, configuration tool 26 may store lists of potential substitute components for each primary component that may be identified in a bill of material. Alternatively or in addition, configuration tool 26 may identify potential substitute components in response to identifying a trigger. Information used by configuration tool 26 to identify potential substitute components may include availabilities, manufacturers, model numbers, and/or any other relevant information.

Configuration tool 26 may utilize various types of information to determine which of multiple potential substitute components to select when substitution is identified as being appropriate. Configuration tool 26 may also receive and/or store substitution rules governing selection of potential substitute components. Substitution rules may include various preferences for potential substitute components. For example, substitution rules may organize multiple potential substitute components according to one or more parameters.

Parameters may include concepts that are the same or similar to concepts discussed above with regard to triggers. Thus, substitution rules may organize potential substitute components based on one or more parameters such as availabilities, manufacturers, costs, models, qualities, and incompatibilities of components. For example, a list of potential substitute components may be prioritized based on cost. Less expensive substitute components may be identified as having priority with respect to more expensive substitute components or vice versa. As another example, potential substitute components may be prioritized based on quality. Higher quality substitute components may be identified as having priority with respect to lower quality substitute components or vice versa.

Availabilities of components may be used to identify or organize potential substitute components. According to particular embodiments, availabilities may be based on information regarding current availabilities of components. Alternatively or in addition, availabilities may be based on information regarding projected or future availabilities of components. Thus, decisions to substitute items may reflect anticipated shipments of products and/or components to or from elements of manufacturing system 10. Furthermore, availabilities of components may be affected by demand groups. When components become or are predicted to become available, the components may be reserved for entities associated with particular demand groups. Demand groups may be defined in various ways. For example, a demand group may be defined as entities in a particular geographic or other type of market, a particular set of customers 22 sharing one or more similarities, or one particular customer 22. According to a particular embodiment, a particular customer 22 may make a commitment or firm forecast to order a minimum quantity of products. In view of that commitment, that particular customer 22 may be defined as associated with a demand group that is reserved a portion of available products and/or components.

Note that two or more parameters may be used to prioritize potential substitute components. For example, highest quality and earliest available substitute components may take priority. In this particular example, two parameters are considered: availability and quality. However, any number may be utilized. Furthermore, note that substitution rules may be configured for particular customers 22. Thus, configuration tool 26 may identify a particular customer 22 and select a substitution rule stored in configuration tool 26 for that particular customer 22.

According to particular embodiments, substitution of items in bills of material may be automatic. That is, configuration tool 26 may automatically substitute a component using an appropriate substitution rule after identifying a trigger. Alternatively, however, configuration tool 26 may indicate to a user of configuration tool 26 that substitution is suggested and allow the user to manually substitute components as the user finds appropriate. In this example, configuration tool 26 may suggest appropriate substitute components based on substitution rules.

Review by a user of configuration tool 26 may be required when a date generated by configuration tool 26 differs from date indicated in an order by a predetermined amount. For example, configuration tool 26 may allow a user to manually substitute components included in a bill of material and/or take other actions to cause a completion date for a manufacturing activity to more closely match a requested completion date communicated by a particular customer 22 associated with an order being reviewed.

Note that configuration tool 26 may adjust priorities of potential substitute components over time with respect to newly available information. Availability information may be updated and utilized as appropriate. For example, availabilities of components may be adjusted with respect to inventories of components, which may change due to orders, changed capacity, and/or other factors. According to a particular embodiment, components with higher inventories may be selected before components with lower inventories. Thus, with time, the identity of the component with the highest inventory may change.

Substitution rules may include item exceptions. Exceptions may indicate that selection of a potential substitute component is inappropriate for some reason. Various factors may cause an exception. For example, an exception may be indicated due to an incompatibility of a selected substitute component with another component in a bill of material. According to a particular embodiment, for a product ordered by a particular customer 22, configuration tool 26 may not allow components to be used in the product that are manufactured or supplied by a competing customer 22. Alternatively or in addition, incompatibilities may reflect errors created by using two particular components in a single product.

Note that an entire requested product may be substituted as appropriate. For example, a specific model ordered by a particular customer 22 may be an unavailable newer model while older models may exist in inventory. In this or in other circumstances, configuration tool 26 may substitute an older model of the requested product for the newer model. According to particular embodiments, substitution of finished products may be considered prior to substitution of components.

Furthermore, note that multiple layers of components may exist and be analyzed for possible substitution. For example, a product may include a first set of components. One or more components in the first set of components may actually include multiple subcomponents. Furthermore, one or more of the subcomponents may include multiple subcomponents themselves. Each component and subcomponent may be analyzed for possible substitution using triggers and substitution rules.

Substitution may not always follow identification of a trigger. For example, a user of configuration tool 26 may override a trigger suggesting substitution. However, after configuration tool 26 and/or a user of configuration tool 26 selects substitute components, configuration tool 26 may substitute the selected substitute component for the primary component in the bill of material. Thus, a modified bill of material may be generated by configuration tool 26 in response to substitutions. The modified bill of material may indicate the selected substitute component.

Modified and unmodified bills of material may be communicated to elements of manufacturing system 10 as appropriate. For example, configuration tool 26 in headquarters 12 may communicate a modified bill of material to factory 16 so that factory 16 may manufacture the requested product according to the modified bill of material and using the appropriate components. Furthermore, headquarters 12 and/or factory 16 may communicate the modified bill of material through network 24 to appropriate suppliers 18 and vendors 20 so these elements may supply appropriate components.

Thus, elements within manufacturing system 10 may generate and modify lists of components in bills of material using configuration tool 26. Items may be substituted in response to triggers, and substitute items may be selected based on substitution rules. Furthermore, bills of material may be communicated to appropriate elements within manufacturing system 10.

Figure 2:
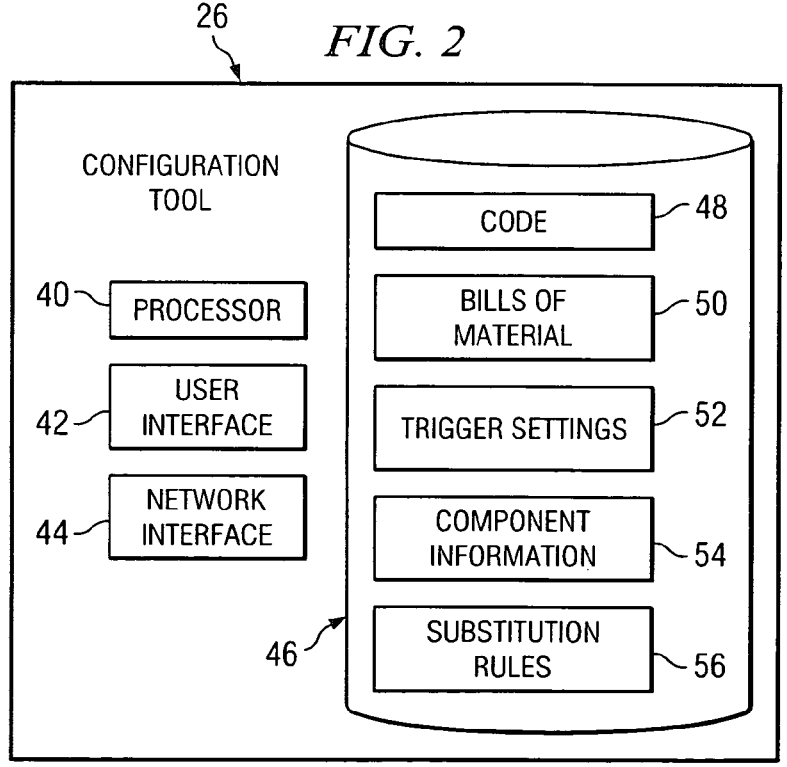
FIG. 2 illustrates functional components of a configuration tool that can substitute items in the manufacture of products.

FIG. 2 is a block diagram illustrating exemplary functional components of configuration tool 26. In the embodiment illustrated, configuration tool 26 includes a processor 40, a user interface 42, a network interface 44, and a memory 46. These functional components can operate to substitute items in the manufacture of products.

Processor 40 represents any hardware and/or logic elements operable to control and process information. Processor 40 controls the operation and administration of elements within configuration tool 26. For example, processor 40 operates to process information received from user interface 42, network interface 44, and memory 46. Thus, processor 40 may be a programmable logic device, a controller, and/or any other suitable processing device.

User interface 42 represents hardware and/or software for inputting information into configuration tool 26 and outputting information from configuration tool 26. For example, user interface 42 may receive input such as information regarding orders for products and substitution rules from a user of configuration tool 26. User interface 42 may also display this and other information such as bills of materials to a user of configuration tool 26. Thus, user interface 42 may include hardware components such as keyboard, mouse, display, and/or other appropriate devices as well as associated software for inputting and outputting information.

Network interface 44 represents hardware and/or software operable to communicate information to and receive information from devices coupled to configuration tool 26. For example, network interface 44 may communicate with headquarters 12, factories 14, sales offices 16, suppliers 18, vendors 20, and customers 22. Thus, network interface 44 includes any suitable hardware or controlling logic to communicate information to or from elements coupled to configuration tool 26.

Memory 46 represents any one or a combination of volatile or non-volatile local or remote devices suitable for storing information. Memory 46 stores, either permanently or temporarily, data or other information for processing by processor 40 and communicating using user interface 42 and/or network interface 44. For example, memory 46 may include random access memory (RAM), read only memory (ROM), magnetic storage devices, optical storage devices, or any other suitable information storage device or a combination of these devices. As illustrated, memory 46 may include one or more memory modules.

Code 48 includes software, executable files, and/or appropriate logic modules capable when executed to control the operation of configuration tool 26. For example, code 48 may include executable files capable of processing orders and substituting items in the manufacture of products. Bills of material 50 store information identifying components scheduled to be assembled into products. For example, bills of material 50 may include lists of components, dates associated with assembly of the components into products, and/or identifiers associating the lists with particular orders. Trigger settings 52 stores information relevant to triggering substitution of items. For example, trigger settings 52 may indicate acceptable and unacceptable circumstances, such as availabilities, costs, and/or compatibilities of components. Component information 54 stores information concerning components that are or may be scheduled to be assembled into products. For example, component information 54 may include availabilities, costs, and/or compatibilities of components. Substitution rules 56 identify settings for selecting substitute components. For example, substitution rules 56 may indicate that substitute components may be selected based on preferences, availabilities, costs, and/or compatibilities of components.

In operation, configuration tool 26 substitutes items in the manufacture of products. A user of configuration tool 26 may input settings and other information into configuration tool 26 through user interface 42. For example, a user may input information regarding bills of material 50, trigger settings 52, component information 54, and/or substitution rules 56. Alternatively or in addition, information may be input into configuration tool 26 through network interface 44. For example, information such as bills of material 50, trigger settings 52, component information 54, and/or substitution rules 56 may be communicated to network interface 44 through network 24.

According to a particular embodiment, a user of configuration tool 26 may configure trigger settings 52 and/or substitution rules 56 using user interface 42. For example, a user may configure trigger settings 52 and/or substitution rules 56 for particular customers 22. Alternatively or in addition, a user may configure trigger settings 52 and/or substitution rules 56 for particular products and/or components. Thus, a user may tailor settings and rules for particular circumstances.

Orders for products may be received by configuration tool 26 through user interface 42 and/or network interface 44. For example, orders may be communicated to network interface 44 in a text-based, markup language such as XML. After receiving an order, processor 40 may generate a bill of material 50 for the order. For example, processor 40 may execute code 48 to identify a requested product and components used in the manufacture of the requested product.

Processor 40 may also execute code 48 to identify one or more triggers suggesting substitution of one or more items in the particular bill of material 50. Processor 40 may analyze each component listed in the particular bill of material 50. For example, processor 40 may access component information 54 and compare the accessed component information 54 with trigger settings 52.

According to a particular embodiment, processor 40 may access component information 54 indicating that a particular component may not be available by a deadline associated with trigger settings 52 for that component. Alternatively or in addition, cost indicated in component information 54 may exceed a threshold cost identified in trigger settings 52 for that component. Alternatively or in addition, processor 40 may determine that a combination of components in a particular bill of material 50 is identified in trigger settings 52 as being incompatible. Thus, in various ways code 48 may be executed by processor 40 to determine whether substitution may be appropriate.

In response to identifying a trigger, or at any other appropriate time, processor 40 may execute code 48 to identify potential substitute components and to determine how potential substitute components should be selected. Processor 40 may utilize component information 54 and substitution rules 56 to identify potential substitute components and to determine how potential substitute components should be selected. According to a particular embodiment, component information 54 may be organized to identify potential substitute components for particular components. Furthermore, substitution rules 56 may be associated with particular primary components.

Substitution rules 56 may indicate a way to prioritize potential substitute components. As discussed above, priority may be based on one or more of various parameters. According to a particular embodiment, substitution rules 56 may indicate that potential substitute components should be organized based on availability. For example, processor 40 may access component information 54 to identify availability dates of particular potential substitute components. Using this information, processor 40 may organize multiple potential substitute components. Alternatively or in addition, various other substitution rules 56 may apply. For example, potential substitute components may be organized by cost, quality, or any other appropriate factor. Furthermore, processor 40 may analyze potential substitute components to identify incompatibilities between potential substitute components and other components listed in a bill of material 50.

Processor 40 may select a potential substitute component automatically or in response to input from a user through user interface 42. After a substitute component is selected, processor 40 may generate a new bill of material 50 identifying the selected substitute component. Processor 40 may communicate the new bill of material 50 through network 24 using network interface 44. For example, the new bill of material 50 may be communicated to a particular factory 16, supplier 18, and/or vendor 20 involved in the manufacture of the requested product associated with the bill of material.

Thus, the elements of configuration tool 26 may operate to substitute one or more items in a bill of material in response to one or more triggers. Furthermore, configuration tool 26 may substitute items in a bill of material according to substitution rules. In addition, configuration tool 26 may transmit the bill of material through network 24.

While this example includes specific functional components for configuration tool 26, configuration tool 26 may include any collection and arrangement of components, including some or all of the enumerated functional components, for substituting items in manufacturing products. Moreover, configuration tool 26 contemplates implementing each of the functional components using any suitable combination and arrangement of hardware and/or logic, and implementing any of the functionalities using a computer program stored on a computer readable medium. Furthermore, configuration tool 26 may be implemented as a stand-alone device, or aspects of configuration tool 26 may be distributed among various devices.

Figure 3:
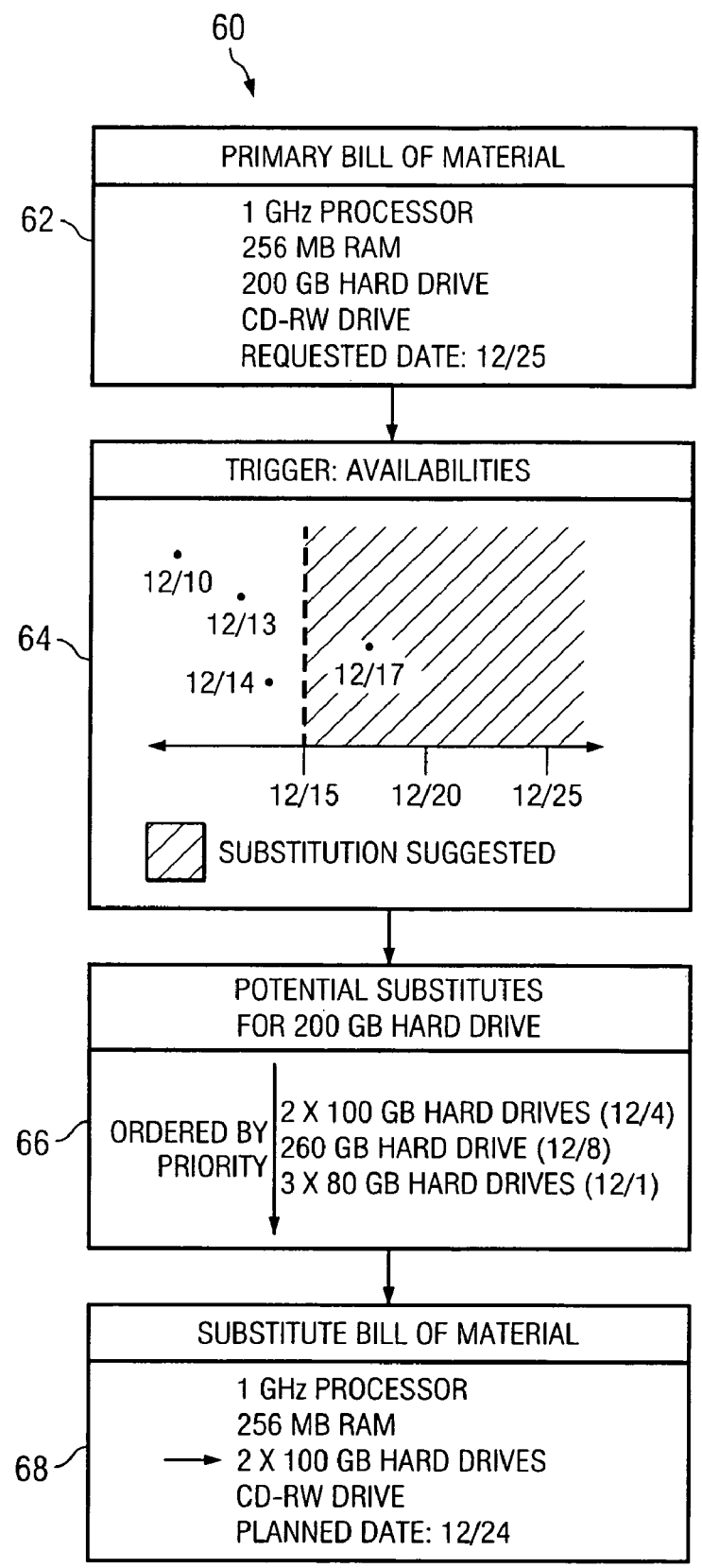
FIG. 3 illustrates an example of item substitution in response to a particular trigger and according to a particular substitution rule.

FIG. 3 illustrates an example of item substitution. The example involves a particular trigger and a particular substitution rule. The example is provided for illustrative purposes, and various types of triggers and substitution rules may be utilized as appropriate.

Configuration tool 26 generates primary bill of material 62 in response to receiving an order from a particular customer 22 for a particular product. In the example primary bill of material 62 illustrated, the requested product is a computer. Thus, primary bill of material 62 includes primary components identified by configuration tool 26 as included in the manufacture of the requested computer. One or more of the particular components listed may be identified by the particular customer 22. Alternatively or in addition, one or more of the components may be a default component identified by configuration tool 26 as being used in the manufacture of the requested computer.

As illustrated, the components include a one gigahertz (GHz) processor, 256 megabytes (MB) of RAM, a 200 gigabyte (GB) hard drive, and a compact disk rewrite drive (CD-RW). In addition, primary bill of material 62 indicates a requested date of December 25. This requested date may be associated with primary bill of material 62 for various reasons. For example, customer 22 may indicate to configuration tool 26 that customer 22 desires to receive the computer by December 25. Note that while particular components are listed, various types and numbers of components may be included in a bill of material. Furthermore, while a particular date is listed, various types and numbers of dates may be included as appropriate. Alternatively, no date may be included in a bill of material.

Trigger information 64 indicates that substitution may be appropriate in this example. In the embodiment illustrated, configuration tool 26 uses availabilities of the components to determine whether substitution is triggered. Note that the chart indicates that substitution is suggested if components are not available until after December 15. Configuration tool 26 may determine that December 15 is an appropriate deadline based on the requested date of December 25 indicated in primary bill of material 62. Configuration tool 26 may identify a deadline in various ways. For example, configuration tool 26 may use a lead time to account for actual production and any delays that may be involved in the manufacture of the requested computer. As illustrated, the deadline associated with access to components listed in primary bill of material 62 is December 15.

Configuration tool 26 may access information related to components listed in bill of material 62 to identify the dates indicated in the chart in trigger information 64. As shown in the chart, configuration tool 26 indicates that one of the four components will not be available until after the deadline. For purposes of illustration, assume that the 200 GB hard drive will not be available until December 17, which is after the indicated deadline of December 15. Thus, configuration tool 26 identifies a trigger that suggests that substitution may be appropriate for the 200 GB hard drive.

Configuration tool 26 may identify potential substitutes for the 200 GB hard drive by accessing relevant information such as a substitution rule. Configuration tool 26 may utilize the identified substitution rule to prioritize the potential substitute components as shown in list 66. As illustrated, potential substitutes may include two 100 GB hard drives, one 260 GB hard drive, and three 80 GB hard drives. Configuration tool 26 may order these potential substitute components.

In the embodiment illustrated, the potential substitute components are ordered based on a predetermined priority, with higher priority potential substitute components listed closer to the top of list 66. Note that list 66 identifies availability dates with each potential substitute component. As illustrated, each of the potential substitute components are associated with an availability date that is prior to the deadline of December 15. According to a particular embodiment, potential substitute components may be prioritized based on availability dates. For example, potential substitute components with availability dates closer to a deadline date may take priority with respect to other potential substitute components with availability dates further away from the deadline date. However, potential substitute components may be prioritized in any of various manners. For example, potential substitute components may be prioritized based on a configuration selected by a user of configuration tool 26.

After identifying list 66, configuration tool 26 may automatically select the two 100 GB hard drives as the appropriate substitute for the 200 GB hard drive based on the substitution rules and the accessed information related to the potential substitute components. Alternatively, a user of configuration tool 26 may analyze list 66 and select the two 100 GB hard drives or any other listed potential substitute component.

After the two 100 GB hard drives have been selected, configuration tool 26 may substitute the two 100 GB hard drives for the 200 GB hard drive as illustrated in substitute bill of material 68. Note that substitute bill of material 68 indicates a planned date of December 24. This date may be identified by configuration tool 26 based on the latest availability date associated with components listed in substitute bill of material 68. As shown in list 66, the two 100 GB hard drives are not scheduled to be available in the manufacture of the requested computer until December 14. Configuration tool 26 may use this date to identify that manufacture of the computer and shipment of the computer to customer 22 may be completed by December 24. Note that configuration tool 26 may communicate the plan date and/or a plan date with an added buffer to appropriate elements of manufacturing system 10 such as customer 22. Furthermore, the substitute bill of material may be communicated to appropriate elements of manufacturing system 10 through network 24. For example, substitute bill of material 68 may be communicated through network 24 to a particular factory 16 that will assemble the components to form the requested computer.

Thus, configuration tool 26 may substitute items in bills of material in response to triggers and according to substitution rules associated with requested products and/or components. Note that while this example includes a particular requested product, particular components, a particular trigger, and particular substitution rules, embodiments of the present invention may utilize these and other parameters as appropriate.

Figure 4:
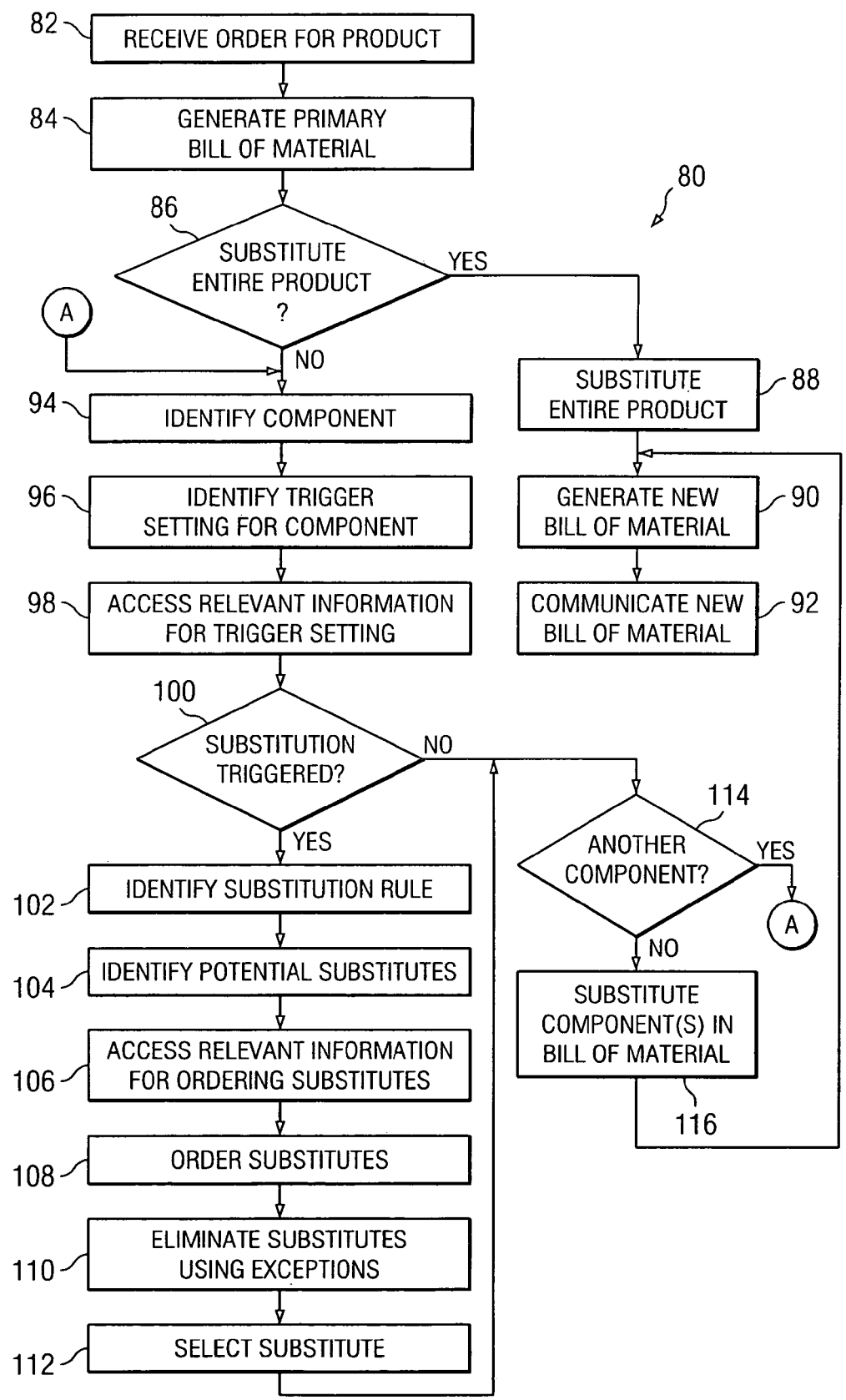
FIG. 4 is a flowchart illustrating a method of substituting items in the manufacture of products.

FIG. 4 is a flowchart illustrating a method 80 for substituting items in the manufacture of products. Configuration tool 26 receives an order for a product at step 82. For example, the order may be input into configuration tool 26 or communicated to configuration tool 26 through network 24. After receiving the order, configuration tool 26 generates a primary bill of material at step 84. The primary bill of material lists primary components to be assembled into the requested product. At step 86, configuration tool 26 determines whether to substitute the entire requested product. If configuration tool 26 determines to substitute the entire requested product, configuration tool 26 substitutes the entire requested product with a substitute product at step 88. For example, an older model of a requested product may be substituted for a new model of a requested product to empty an inventory of the older models. After substituting the entire product, configuration tool 26 generates a new bill of material at step 90. The new bill of material identifies the substitute product. Configuration tool 26 communicates the new bill of material to appropriate elements of manufacturing system 10 at step 92.

Returning to step 86, if configuration tool 26 determines not to substitute the entire requested product, the configuration tool 26 identifies one of the components in the primary bill of material at step 94. Configuration tool 26 identifies trigger settings for the identified component at step 96. Various types of trigger settings may be associated with the identified component. For example, trigger settings may indicate to configuration tool 26 to analyze availabilities, costs, and/or other relevant factors to determine whether substitution of the identified component is triggered.

Configuration tool 26 accesses relevant information for the identified setting at step 98. For example, configuration tool 26 may access information indicating an availability of the identified component if the identified trigger setting regards a deadline for availabilities of components. As another example, configuration tool 26 may access information regarding cost of the component if the identified trigger setting regards a threshold for cost of the component. Configuration tool 26 analyzes the accessed information in light of the trigger setting to determine whether substitution is triggered at step 100. For example, substitution may be triggered if an availability date associated with the identified component extends past the deadline and/or if a cost of the identified component exceeds a threshold. However, these and various other triggers and related information may be analyzed.

If configuration tool 26 determines that substitution is not triggered, configuration tool 26 determines whether another component is listed in the primary bill of material at step 114. On the other hand, if configuration tool 26 determines that substitution is triggered, configuration tool 26 identifies a substitution rule associated with the component at step 102. Configuration tool 26 also identifies potential substitute components for the primary component at step 104. Based on the identified substitution rule, configuration tool 26 accesses relevant information for ordering or prioritizing the potential substitute components at step 106. Relevant information may include availabilities, costs, qualities, incompatibilities, and other relevant information.

Configuration tool 26 orders the potential substitute components according to the substitution rule and the relevant information at step 108. At step 110, configuration tool 26 may eliminate potential substitutes using exceptions. Exceptions may be identified using the substitution rule and/or the information so that incompatibilities may be avoided. For example, exceptions may prevent particular customers 22 from receiving low quality and/or other components manufactured by competitors.

Configuration tool 26 selects a substitute component at step 112. According to particular embodiments, configuration tool 26 may select a first potential substitute component from the ordered list of potential substitute components. Alternatively or in addition, configuration tool 26 may present potential substitutes to a user of configuration tool 26 for selection.

Configuration tool 26 determines whether another component is listed in the primary bill of material at step 114. If another component is listed in the primary bill of material, method 80 returns to step 94. Alternatively, if configuration tool 26 determines that no other components are listed in the primary bill of material, method 80 continues to step 116. At step 116, configuration tool 26 substitutes the selected substitute component for the primary component in the bill of material. After substituting the component in the bill of material, configuration tool 26 generates a new bill of material at step 90 that includes the substituted component.

Configuration tool 26 communicates the new bill of material to appropriate elements of manufacturing system 10 at step 92.

Thus, method 80 illustrates item substitution in the manufacture of a requested product. Triggers may be detected and may generate substitution of components in a requested product. Furthermore, substitution rules may be used to determine appropriate substitute components. A primary bill of material may be converted into a new bill of material appropriate for distribution to elements of manufacturing system 10 for scheduling of manufacturing activities using the components listed in the new bill of material.

Note that while discussed as being utilized in manufacturing system 10, item substitution may be utilized in any appropriate system. Furthermore, item substitution may be utilized in non-manufacturing systems. For example, item substitution may be useful in industries involved in distribution, construction, equipment erection, and/or pure assembly.

The preceding flowchart illustrates a particular method used to substitute items in the manufacture of products. However, this flowchart illustrates only an exemplary method of operation, and the present invention contemplates any suitable techniques, elements, and applications for performing these functions. Thus, many of the steps in the flowchart may take place simultaneously and/or in different orders than as shown. In addition, methods may include additional steps or fewer steps, so long as the methods remain appropriate. Moreover, one or more elements of manufacturing system 10 may work independently and/or in conjunction with other elements to substitute items in the manufacture of products.

Although the present invention has been described in several embodiments, a myriad of changes or modifications may be suggested to one skilled in the art, and it is intended that the present invention encompass such changes and modifications as fall within the present appended claims.

What is claimed is:

1. A device for item substitution in a manufacturing process, comprising:
    a network interface operable to receive an order for manufacture of a product; and
    a processor operable to couple to the network interface, to generate a first electronic bill of material for the product, the first electronic bill of material identifying a plurality of primary components to be assembled into the product, to identify a trigger initiating substitution of one of the primary components, to identify a plurality of potential substitute components in response to the trigger, to identify a substitution rule governing selection of one of the potential substitute components, to select one of the potential substitute components according to the substitution rule, to substitute the selected one of the potential substitute components for the one primary component, and to generate a second electronic bill of material for the product, the second electronic bill of material identifying the selected one of the potential substitute components;
    wherein the trigger is selected from the group consisting of:
        deviation of an availability of the one primary component from a deadline associated with the first electronic bill of material by at least by a predetermined amount;
        cost associated with the one primary component exceeding a threshold cost associated with the one primary component; and
        an incompatibility between the one primary component and a customer;
    wherein selecting one of the potential substitute components according to the substitution rule comprises:
        sorting a list of the potential substitute components according to a parameter, the parameter selected from the group consisting of availabilities of the potential substitute components, identities of manufacturers of the potential substitute components, costs of the potential substitute components, and models of the potential substitute components; and
        selecting a first one of the potential substitute components on the sorted list;
    wherein the substitution rule identifies incompatibilities between particular primary components and particular potential substitute components and prevents selection of the particular potential substitute components based on the identified incompatibilities;
    wherein the network interface is further operable to transmit the second electronic bill of material to a remote manufacturing facility; and
    wherein the second electronic bill of material conforms to an extensible markup language (XML) standard.

2. A method for item substitution in a manufacturing process, comprising:
    receiving an order for manufacture of a product;
    generating a first electronic bill of material for the product, the first electronic bill of material identifying a plurality of primary components to be assembled into the product;
    identifying a trigger initiating substitution of one of the primary components wherein identifying the trigger initiating substitution of one of the primary components comprises:
        determining an availability of the one primary component;
        determining a deadline associated with the first electronic bill of material; and
        identifying that the availability deviates from the deadline at least by a predetermined amount;
    identifying a plurality of potential substitute components in response to the trigger;
    identifying a substitution rule governing selection of one of the potential substitute components;
    selecting one of the potential substitute components according to the substitution rule;
    substituting the selected one of the potential substitute components for the one primary component; and
    generating a second electronic bill of material for the product, the second electronic bill of material identifying the selected one of the potential substitute components.

3. A method for item substitution in a manufacturing process, comprising:
    receiving an order for manufacture of a product;
    generating a first electronic bill of material for the product, the first electronic bill of material identifying a plurality of primary components to be assembled into the product;
    identifying a trigger initiating substitution of one of the primary components, wherein identifying the trigger initiating substitution of one of the primary components comprises:
        determining a cost associated with the one primary component;
        determining a threshold cost associated with the one primary component; and
        identifying that the cost exceeds the threshold cost;

identifying a plurality of potential substitute components in response to the trigger;

identifying a substitution rule governing selection of one of the potential substitute components;

selecting one of the potential substitute components according to the substitution rule;

substituting the selected one of the potential substitute components for the one primary component; and generating a second electronic bill of material for the product, the second electronic bill of material identifying the selected one of the potential substitute components.

4. The method of claim 2, wherein identifying the trigger initiating substitution of one of the primary components comprises:

identifying a customer associated with the order; and identifying an incompatibility between the one primary component and the customer.

5. The method of claim 2, wherein selecting one of the potential substitute components according to the substitution rule comprises:

sorting a list of the potential substitute components according to a parameter; and selecting a first one of the potential substitute components on the sorted list.

6. The method of claim 5, wherein the parameter is selected from the group consisting of availabilities of the potential substitute components, identities of manufacturers of the potential substitute components, costs of the potential substitute components, and models of the potential substitute components.

7. The method of claim 2, wherein the substitution rule identifies incompatibilities between particular primary components and particular potential substitute components and prevents selection of the particular potential substitute components based on the identified incompatibilities.

8. The method of claim 2, further comprising transmitting the second electronic bill of material to a remote manufacturing facility, wherein the second electronic bill of material conforms to an extensible markup language (XML) standard.

9. A device for item substitution in a manufacturing process, comprising:

an interface operable to receive an order for manufacture of a product; and a processor operable to couple to the interface, to generate a first electronic bill of material for the product, the first electronic bill of material identifying a plurality of primary components to be assembled into the product, to identify a trigger initiating substitution of one of the primary components, to identify a plurality of potential substitute components in response to the trigger, to identify a substitution rule governing selection of one of the potential substitute components, to select one of the potential substitute components according to the substitution rule, to substitute the selected one of the potential substitute components for the one primary component, and to generate a second electronic bill of material for the product, the second electronic bill of material identifying the selected one of the potential substitute components, wherein identifying the trigger initiating substitution of one of the primary components comprises: determining an availability of the one primary component; determining a deadline associated with the first electronic bill of material; and identifying that the availability deviates from the deadline at least by a predetermined amount.

10. A device for item substitution in a manufacturing process, comprising:

an interface operable to receive an order for manufacture of a product; and a processor operable to couple to the interface, to generate a first electronic bill of material for the product, the first electronic bill of material identifying a plurality of primary components to be assembled into the product, to identify a trigger initiating substitution of one of the primary components, to identify a plurality of potential substitute components in response to the trigger, to identify a substitution rule governing selection of one of the potential substitute components, to select one of the potential substitute components according to the substitution rule, to substitute the selected one of the potential substitute components for the one primary component, and to generate a second electronic bill of material for the product, the second electronic bill of material identifying the selected one of the potential substitute components, wherein identifying the trigger initiating substitution of one of the primary components comprises: determining a cost associated with the one primary component; determining a threshold cost associated with the one primary component; and identifying that the cost exceeds the threshold cost.

11. The device of claim 9, wherein identifying the trigger initiating substitution of one of the primary components comprises:

identifying a customer associated with the order; and identifying an incompatibility between the one primary component and the customer.

12. The device of claim 9, wherein selecting one of the potential substitute components according to the substitution rule comprises:

sorting a list of the potential substitute components according to a parameter; and selecting a first one of the potential substitute components on the sorted list.

13. The device of claim 12, wherein the parameter is selected from the group consisting of availabilities of the potential substitute components, identities of manufacturers of the potential substitute components, costs of the potential substitute components, and models of the potential substitute components.

14. The device of claim 9, wherein the substitution rule identifies incompatibilities between particular primary components and particular potential substitute components and prevents selection of the particular potential substitute components based on the identified incompatibilities.

15. The device of claim 9, wherein the interface is a network interface and is further operable to transmit the second electronic bill of material to a remote manufacturing facility, wherein the second electronic bill of material conforms to an extensible markup language (XML) standard.

* * * * *